United States Patent [19]

Chen

[11] Patent Number: 5,644,707

[45] Date of Patent: Jul. 1, 1997

[54] COMPUTER MAINFRAME SIGNAL MONITORING SYSTEM

[76] Inventor: Tian-Luh Chen, 2nd Floor, No. 8, Lane 264, Sher-Chung Street, Taipei, Taiwan

[21] Appl. No.: 601,352

[22] Filed: Feb. 16, 1996

[51] Int. Cl.[6] ............................................. G06F 11/00
[52] U.S. Cl. ............................. 395/185.1; 395/184.01; 395/183.22
[58] Field of Search .................... 395/184.01, 185.01, 395/183.21, 183.22, 185.06, 185.04, 185.09, 185.1, 183.01

[56] References Cited

U.S. PATENT DOCUMENTS

| | | | |
|---|---|---|---|
| 3,818,458 | 6/1974 | Deese | 395/184.01 |
| 4,517,671 | 5/1985 | Lewis | 395/183.22 |
| 5,081,627 | 1/1992 | Yu | 395/183.22 |
| 5,327,435 | 7/1994 | Warchol | 395/183.22 |
| 5,402,431 | 3/1995 | Saadeh et al. | 395/184.01 |
| 5,519,832 | 5/1996 | Warchol | 395/183.22 |
| 5,581,482 | 12/1996 | Wiedenman et al. | 395/184.01 |

Primary Examiner—Robert W. Beausoliel, Jr.
Assistant Examiner—Joseph E. Palys
Attorney, Agent, or Firm—Beveridge, DeGrandi, Weilacher & Young LLP

[57] ABSTRACT

A computer mainframe signal monitoring system connected to the mainframe of computer to monitor its signals, including a main control circuit, a data catching and processing integrated circuit and a monitor respectively connected to said main control circuit and controlled by it, wherein the data catching and processing integrated circuit can be mounted in an interface card or the mother board to catch the major function signals of the mother board such as address bus signal, data bus signal, control bus signal, and regular I/O signals, then to send the signals to the monitor; the monitor is comprised of a LED array and a driver IC, the driver IC turns on the respective LEDs of the LED array upon receipt of signals from the data catching and processing integrated circuit, so that the operator can monitor the actual operational conditions of the internal hardware circuits of the computer through the LEDs of the LED array.

1 Claim, 4 Drawing Sheets

COMPUTER MAINFRAME SIGNAL MONITORING SYSTEM

BACKGROUND OF THE INVENTION

The present invention relates to a computer mainframe signal monitoring system which uses a large scale integrated circuit to catch the major signals of the mother board such as address bus signal, data bus signal, control bus signal, and regular I/O signals, and then to send the caught signals to a driver IC, causing it to drive respective LEDs.

When a computer is controlled to execute a software program or to draw a complicated drawing, it may break down. However, the operator may not know the sudden failure of the computer, and a lot of time may be wasted in watching the display. There is known an inspection card designed for inspection the operation of the mother board. When in use, the shell of the computer must be opened so that the inspection card can be installed in the mother board to detect its circuit. This inspection card is small, and the user needs to watch the LEDs with much effort.

SUMMARY OF THE INVENTION

The present invention has been accomplished under the circumstances in view. It is the major object of the present invention to provide a computer mainframe signal monitoring system which automatically monitors the operation of the internal hardware circuit of the computer.

According to the present invention, the computer mainframe signal monitoring system is connected to the mainframe of computer to monitor its signals, comprising a main control circuit, a data catching and processing integrated circuit and a monitor respectively connected to said main control circuit and controlled by it, wherein the data catching and processing integrated circuit can be mounted in an interface card or the mother board to catch the major function signals of the mother board such as address bus signal, data bus signal, control bus signal, and regular I/O signals, then to send the signals to the monitor; the monitor is comprised of a LED array and a driver IC, the driver IC turns on the respective LEDs of the LED array upon receipt of signals from the data catching and processing integrated circuit, so that the operator can monitor the actual operational conditions of the internal hardware circuits of the computer through the LEDs of the LED array.

DETAILED DESCRIPTION OF THE PREFERRED EMBODIMENT

Figure 1:
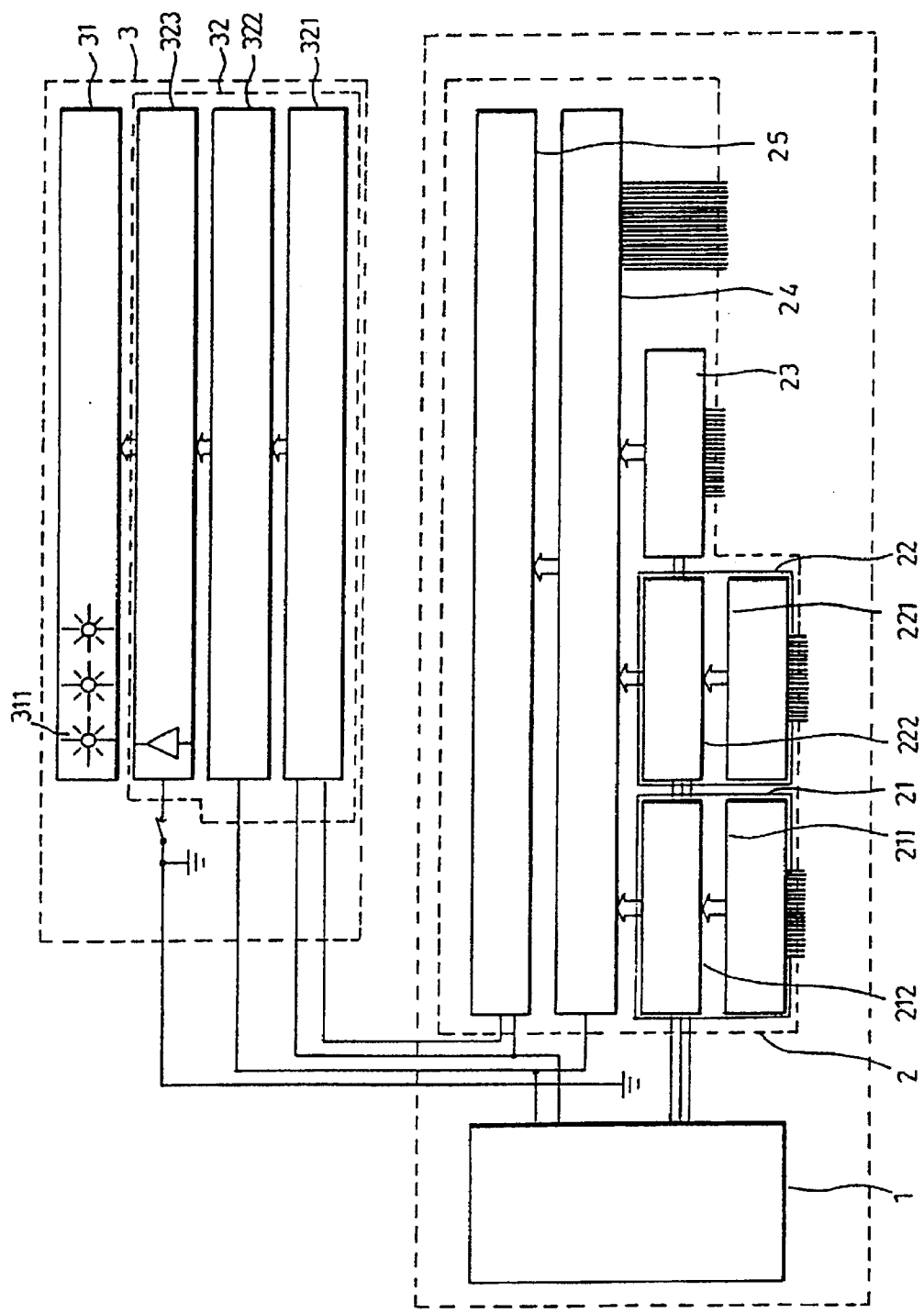
FIG. 1 is a circuit block diagram of the present invention.
Figure 2:
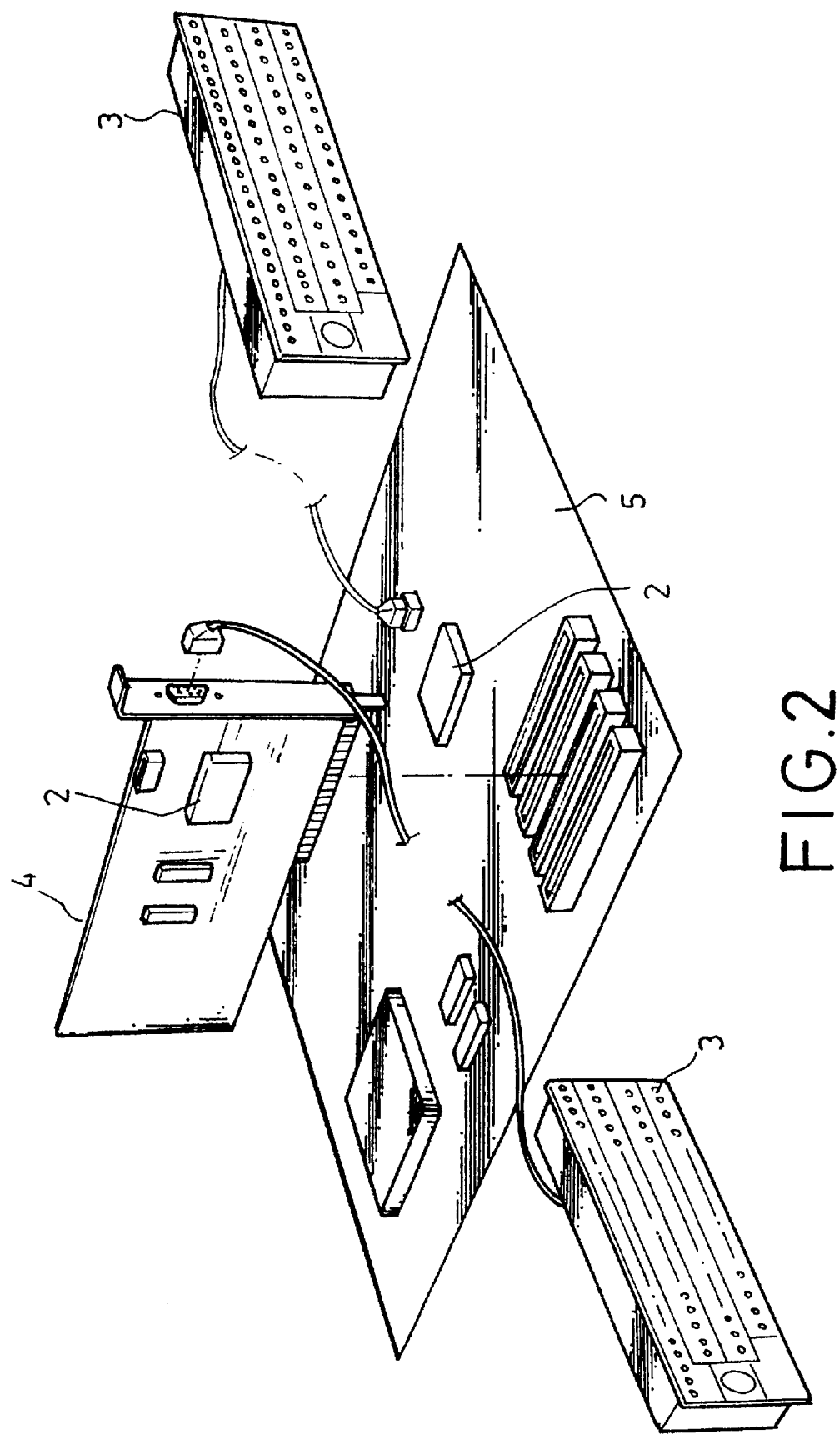
FIG. 2 shows two different arrangements of the present invention.

Referring to FIGS. 1 and 2, a computer mainframe signal monitoring system in accordance with the present invention is generally comprised of a main control circuit 1, a data catching and processing integrated circuit 2, and a monitor 3. The data catching and processing integrated circuit 2 and the monitor 3 are respectively connected to the main control circuit 1 and controlled by it. The data catching and processing integrated circuit 2 is comprised of an I/O signal decoding and processing circuit 21, a control signal catching and delay circuit 22, a preliminary latching logic 23, a latching logic 24, and a parallel in serial out register array 25. The monitor 3 is comprised of a LED array 31 and a driver IC 32. The LEDs of the LED array 31 of the monitor 3 respectively correspond to the major function signals of the mother board such as A0–A3, D0–D31, IRQ0–IRQ15, DRQ0–DRQ7, and regular I/O signals such as COM1–COM4, LPT1–LPT3. The driver IC 32 comprises a serial in parallel out register array 321, a latching logic 322, and a driver circuit 323.

The I/O signal decoding and processing circuit 21 is comprised of a decoder circuit 211, and a signal catching and delay circuit 212. The decoder circuit 211 is connected to the I/O address line (such as LPT1–LPT3, COM1–COM4) to decode its signal, and then to send the decoded I/O signal to the signal catching and delay circuit 212. The signal catching and delay circuit 212 catches the decoded I/O signal from the decoder circuit 211, and then sends it to the latching logic 24 after a predetermined time delay.

The control signal catching and delay circuit 22 is comprised of a control signal catching circuit 221, and a delay circuit 222. The control signal catching circuit 221 is connected to the control bus to catch the control signal, and then to send the caught control signal to the delay circuit 22, which sends the control signal to the latching logic 24 after a predetermined time delay.

The preliminary latching logic 23 is connected to the data bus to latch the data so that the latching circuit 24 can catch the data.

The latching logic 24 is connected to the I/O signal decoding and processing circuit 21, the control signal catching and delay circuit 22, the preliminary latching logic 23, and the address bus, and sends the caught data to the parallel in serial out register array 25. The parallel in serial out register array 25 sends the parallel input data to the serial in parallel out register array 321 of the driver IC 32 by means of serial output. Therefore, only one line is needed for data transmission between the parallel in serial out register array 25 and the serial in parallel out register array 321.

Furthermore, the serial in parallel out register array 321 of the driver IC 32 sends the received data to the latching logic 322 by means of parallel output, and the latching logic 322 sends the caught data to the driver circuit 323, causing it to drive the respective LEDs 311 of the LED array 31.

Referring to FIGS. 1 and 2 again, the data catching and processing integrated circuit 2 can be mounted in an interface card 4 or the mother board 5 to catch the major function signals of the mother board such as address bus signal, data bus signal, control bus signal, and regular I/O signals, then to send the signals to the driver IC 32 for driving the LED array 31 after the processing procedure of for example decoding, latching, delaying, and shifting. Through the LEDs 311, the operator knows the actual operational conditions of the internal hardware circuits of the computer.

Figure 3:
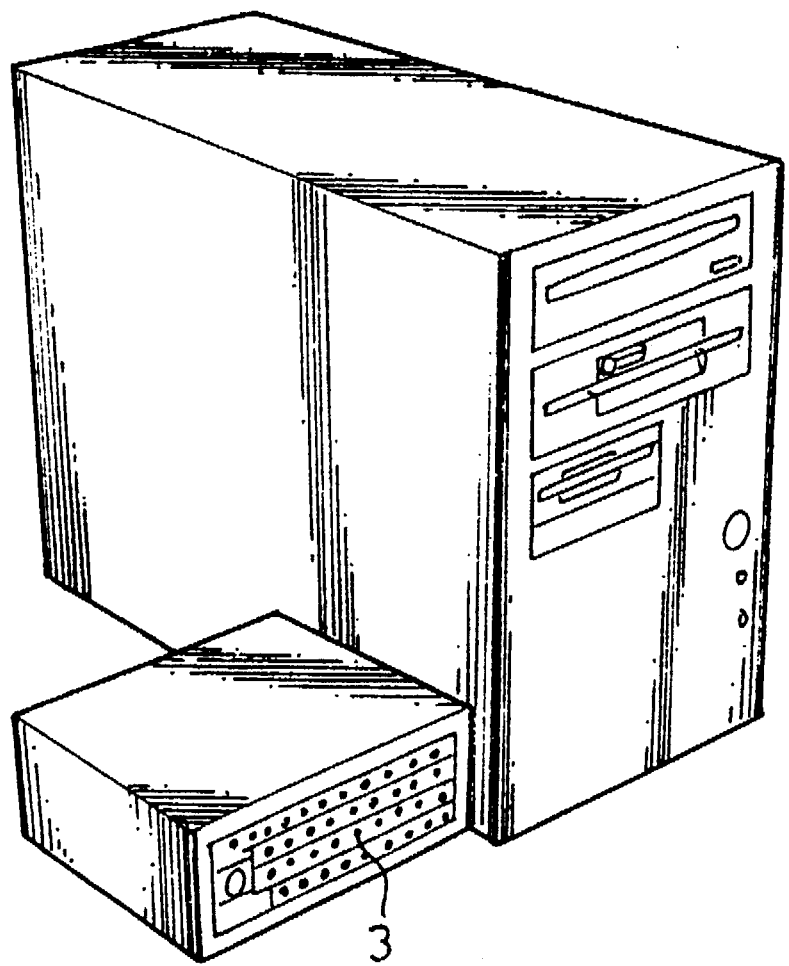
FIG. 3 shows an installation example of the monitor according to the present invention.
Figure 5:
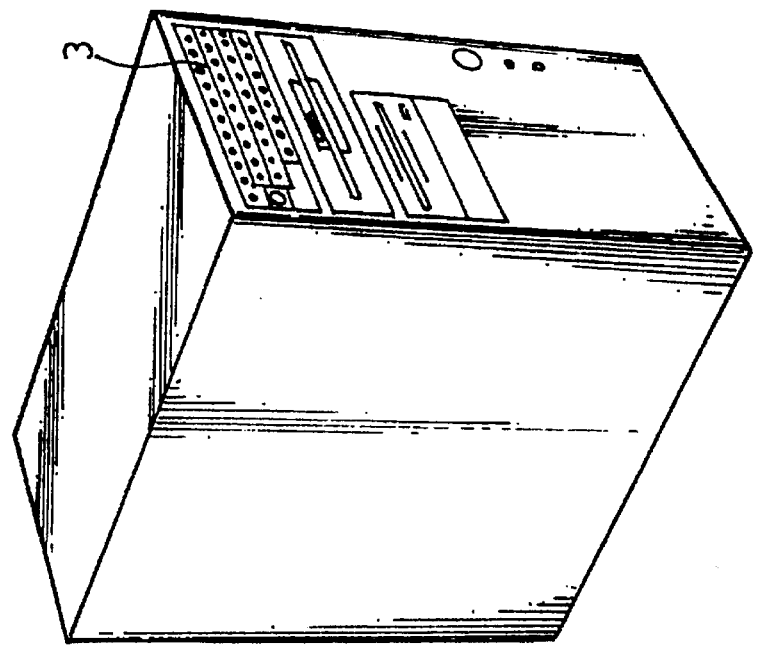
FIG. 5 shows still another installation example of the monitor according to the present invention.
Figure 4:
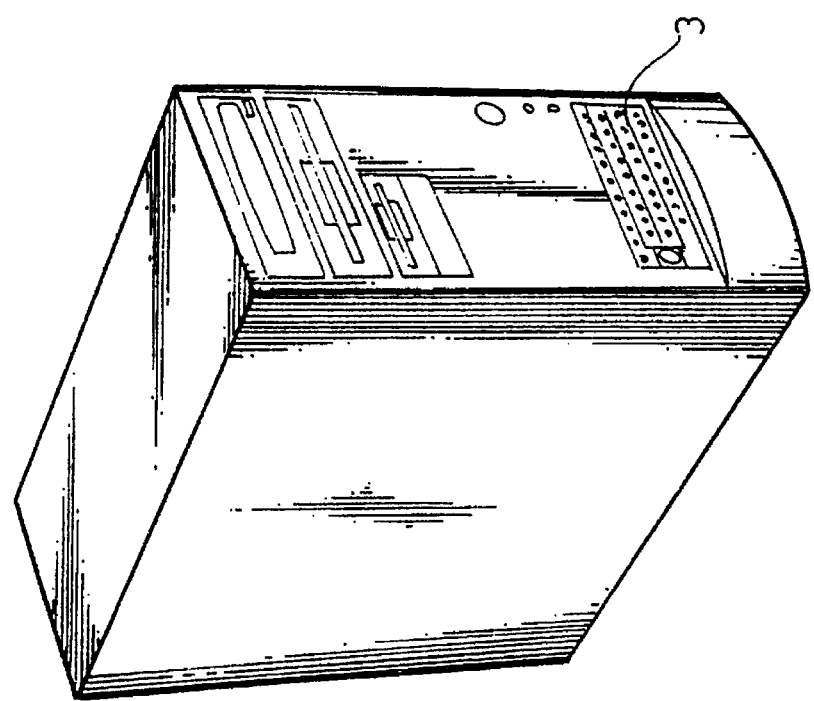
FIG. 4 shows another installation example of the monitor according to the present invention.

Referring to FIGS. 3, 4, and 5, the monitor 3 can be mounted outside the computer (see FIG. 3), or installed in the front panel of the computer (see FIG. 4) or in one 5¼" diskdrive slot (see FIG. 5).

What the invention claimed is:

1. A computer mainframe signal monitoring system connected to the mainframe of computer to monitor its signals, comprising a main control circuit, a data catching and processing integrated circuit and a monitor respectively connected to said main control circuit and controlled by it, wherein said monitor is comprised of a LED array and a driver IC, the LEDs of said LED array of said monitor respectively corresponding to the major function signals of a motherboard of the mainframe such as A0–A3, D0–D31, IRQ0–IRQ15, DRQ0–DRQ7, and regular I/O signals such as COM1–COM4, LPT1–LPT3, said driver IC comprising a serial in parallel out register array, a latching logic, and a driver circuit; said catching and processing integrated circuit is comprised of an I/O signal decoding and processing circuit, a control signal catching and delay circuit, a preliminary latching logic, a latching logic, and a parallel in serial out register array, said I/O signal decoding and processing circuit comprised of a decoder circuit and a signal catching and delay circuit, said decoder circuit being connected to an I/O address line of the mainframe to decode its signal and then to send the decoded I/O signal to said signal catching and delay circuit, said signal catching and delay circuit catching the decoded I/O signal from said decoder circuit and then sending it to the latching logic of said data catching and processing integrated circuit after a predetermined time delay, said control signal catching and delay circuit comprised of a control signal catching circuit and a delay circuit, said control signal catching circuit being connected to a control bus of the mainframe to catch the control signal and then to send the caught control signal to said delay circuit, which sends the control signal to the latching logic of said data catching and processing integrated circuit after a predetermined time delay, said preliminary latching logic being connected to the data bus of the mainframe to latch the data so that the latching circuit of said data catching and processing integrated circuit can catch the data, the latching logic of said data catching and processing integrated circuit being connected to said I/O signal decoding and processing circuit, said control signal catching and delay circuit, said preliminary latching logic, and the address bus of the mainframe, and sending the caught data to said parallel in serial out register array, said parallel in serial out register array sending the parallel input data to the serial in parallel out register array of said driver IC by means of serial output; the serial in parallel out register array of said driver IC sending the received data to the latching logic of said driver IC by means of parallel output, and the latching logic of said driver IC sending the caught data to said driver circuit, causing it to drive the respective LEDs of said LED array; said data catching and processing integrated circuit being to catch the major function signals of the mother board of the mainframe such as address bus signal, data bus signal, control bus signal, and regular I/O signals, then to send the signals to said driver IC for driving said LED array.

* * * * *